(12) United States Patent
Furgal

(10) Patent No.: US 7,856,293 B2
(45) Date of Patent: Dec. 21, 2010

(54) METHOD AND DEVICE FOR MEASURING THE ORIENTATION OF AN AIRCRAFT NOSE LANDING GEAR

(75) Inventor: Bernard Furgal, Saint Genies Bellevue (FR)

(73) Assignee: Airbus France, Toulouse (FR)

( * ) Notice: Subject to any disclaimer, the term of this patent is extended or adjusted under 35 U.S.C. 154(b) by 933 days.

(21) Appl. No.: 11/576,029

(22) PCT Filed: Sep. 19, 2005

(86) PCT No.: PCT/FR2005/002307

§ 371 (c)(1),
(2), (4) Date: Mar. 26, 2007

(87) PCT Pub. No.: WO2006/035132

PCT Pub. Date: Apr. 6, 2006

(65) Prior Publication Data

US 2007/0260365 A1 Nov. 8, 2007

(30) Foreign Application Priority Data

Sep. 28, 2004 (FR) .................................. 04 10236

(51) Int. Cl.
*G01C 25/00* (2006.01)
(52) U.S. Cl. ........................... 701/3; 701/29; 73/117.02
(58) Field of Classification Search ....................... None
See application file for complete search history.

(56) References Cited

U.S. PATENT DOCUMENTS 7,089,150 B2 * 8/2006 Phillips, III ................. 702/154

FOREIGN PATENT DOCUMENTS

| EP | 0 617 259 | 9/1994 |
| EP | 0 836 990 | 4/1998 |

OTHER PUBLICATIONS

International Search Report dated Apr. 21, 2006.

* cited by examiner

*Primary Examiner*—Michael J. Zanelli
(74) *Attorney, Agent, or Firm*—Dickinson Wright PLLC

(57) ABSTRACT

A device including an inertial reference station for measuring an aircraft heading. An inertial reference unit which is mountable on a wheel of a nose landing gear by a fixing system, and is used for measuring the heading of said landing gear in a non-steering position. A data processing unit includes a comparison unit for carrying out a comparison between the measured heading of the nose landing gear and the measured aircraft heading in such a way that the orientation of the nose landing gear is calculated with respect to the aircraft body.

16 Claims, 5 Drawing Sheets

METHOD AND DEVICE FOR MEASURING THE ORIENTATION OF AN AIRCRAFT NOSE LANDING GEAR

TECHNICAL FIELD OF THE INVENTION

The present invention relates to a method and a device for measuring the orientation of the nose landing gear of an aircraft, in particular of a transport aircraft.

BACKGROUND OF THE INVENTION

It is known that when running over the ground, for example over an accessway or a runway of an airport, the steering of an aircraft is performed by way of the deflection of the nose landing gear. In order for a pilot to be able to carry out such steering over the ground under the best possible conditions, it is of course necessary that, in the undeflected position, the nose landing gear be parallel to the fuselage of the aircraft so that a rightward (or leftward) deflection command causes a proportional deflection of the wheels to the right (or to the left) and that with no deflection, the aircraft runs straight ahead.

The orientation of the nose landing gear is generally adjusted at the stage of manufacture of said gear. However, despite the existence of such initial adjustment, it may happen that subsequently the wheels of the nose landing gear are no longer oriented entirely parallel to the fuselage so that the pilot must then compensate for a drift of the aircraft to one side when he wishes to run straight ahead, for example in the center of a runway. Such a maladjustment must of course be corrected, in particular for reasons of comfort of ground running, as well as for safety reasons.

However, to be able to correct such a maladjustment, it is necessary to know the exact orientation of said nose landing gear with respect to the longitudinal axis of the aircraft.

SUMMARY OF THE INVENTION

A laser measurement tool is currently available, comprising in particular an adapter that has to be fixed on the wheels of the landing gear, an associated laser pointer, a central unit and targets. This measurement tool, although accurate and satisfactory overall, exhibits a few drawbacks:
    it requires a clear environment around the aircraft;
    its implementation is relatively lengthy;
    its overall mass is very high;
    its volume is significant; and
    it must be used inside (in a hall), the measurements carried out possibly being disturbed by rain and/or wind.

The object of the present invention is to remedy these drawbacks. It relates to an effective and inexpensive method which is easy to implement, for measuring the orientation of the nose landing gear of an aircraft which is furnished with an inertial reference rig comprising at least one first inertial reference unit.

For this purpose, according to the invention, said method is noteworthy in that:
    a) a second inertial reference unit is mounted on one of the wheels of said nose landing gear;
    b) with the aid of said second inertial reference unit, the heading of said nose landing gear is measured in the absence of deflection of the latter;
    c) with the aid of at least said first inertial reference unit of said inertial reference rig, the heading of the aircraft is measured; and
    d) said measured heading of the nose landing gear is compared with said measured heading of the aircraft in such a way as to deduce therefrom the orientation of said nose landing gear with respect to the fuselage of the aircraft.

Thus, by virtue of the consideration of the two headings, the measurements of the orientation are very accurate.

Moreover, the implementation of said method is simple and fast, in particular with respect to the aforesaid laser measurement tool, since only the second inertial reference unit need be manipulated and mounted on a wheel. Furthermore, the mass and the volume are reduced.

In a preferred embodiment, said second inertial reference unit forms part of said inertial reference rig (which already exists on the aircraft) and, in step a), said second inertial reference unit is dismantled from the aircraft, before being mounted on said wheel. Thus, no device outside the aircraft is necessary for carrying out the measurement of the orientation of the nose landing gear.

Preferably, in step a), said second inertial reference unit is mounted on a plate which is fixed on the rim of said wheel and, more precisely, on parts of screws of said rim which overhang cooperating nuts. Thus, the installation of said second inertial reference unit may be carried out easily, and in a fast and accurate manner.

Advantageously, said inertial reference rig moreover comprises a third inertial reference unit, and the heading of the aircraft is determined with the aid of the measurements carried out by said first and third inertial reference units, thereby making it possible to refine the measurements of heading.

When one wishes (in addition to the measurement) also to adjust the orientation of said nose landing gear, advantageously, as soon as the difference between said measured heading of the nose landing gear and said measured heading of the aircraft is greater than a first predetermined value, the orientation of said nose landing gear is modified in such a way as to obtain a difference which becomes less than a second predetermined value (which is of course less than said first predetermined value).

The present invention also relates to a device for measuring the orientation of the nose landing gear of an aircraft which is furnished with an inertial reference rig comprising at least a first inertial reference unit.

According to the invention, said device is noteworthy in that it comprises:
    said inertial reference rig which is capable of measuring the heading of the aircraft;
    a second inertial reference unit which is capable of being mounted, by way of a fixing system, on a wheel of the nose landing gear and which is then capable of measuring the heading of said nose landing gear in a position corresponding to an absence of deflection; and
    an information processing unit comprising means making it possible to carry out the comparison between said measured heading of the nose landing gear and said measured heading of the aircraft in such a way as to be able to deduce therefrom the orientation of said nose landing gear with respect to the fuselage of the aircraft.

Preferably, said fixing system comprises a plate:
    which is furnished with a fixed support capable of receiving said second inertial reference unit; and
    which is capable of being mounted on the rim of said wheel.

In a particular embodiment, said fixing system is moreover provided:
    with a protection hood, which makes it possible to protect said second inertial reference unit in particular from rain; and/or with a fan. Thus, the device in accordance with the invention may be used without any problem in very hot weather.

In a preferred embodiment, said second inertial reference unit forms part of said inertial reference rig of the aircraft and is capable of being dismantled from said aircraft, thereby making it possible to reduce the cost of the device in accordance with the invention which comprises only measurement elements which already exist on the aircraft.

Moreover, advantageously, said second inertial reference unit is capable of being supplied electrically (in standard fashion) by a means of electrical supply of the aircraft. Thus, the device in accordance with the invention exhibits considerable autonomy.

Furthermore, advantageously, the inertial reference rig, for example of ADIRS type ("Air Data Inertial Reference System"), moreover comprises a third inertial reference unit, and said inertial reference rig determines the heading of the aircraft, with the aid of the measurements carried out by said first and third inertial reference units. Advantageously, at least one of said first, second and third inertial reference units is of the ADIRU type ("Air Data Inertial Reference Unit") and comprises a gyrolaser which uses the acceleration of the earth to determine the heading.

Additionally, in a particular embodiment:
said second inertial reference unit is capable of being linked to said information processing unit in such a way as to be able to transmit information to the latter which comprises at least a screen for displaying measurements; and/or
the device according to the invention moreover comprises a removable reader which is capable of being linked to said second inertial reference unit in such a way as to be able to read the heading measured by the latter and to display it on an integrated display screen.

The figures of the appended drawing will elucidate the manner in which the invention may be embodied. In these figures, identical references designate similar elements.

DETAILED DESCRIPTION OF THE INVENTION

Figure 1:
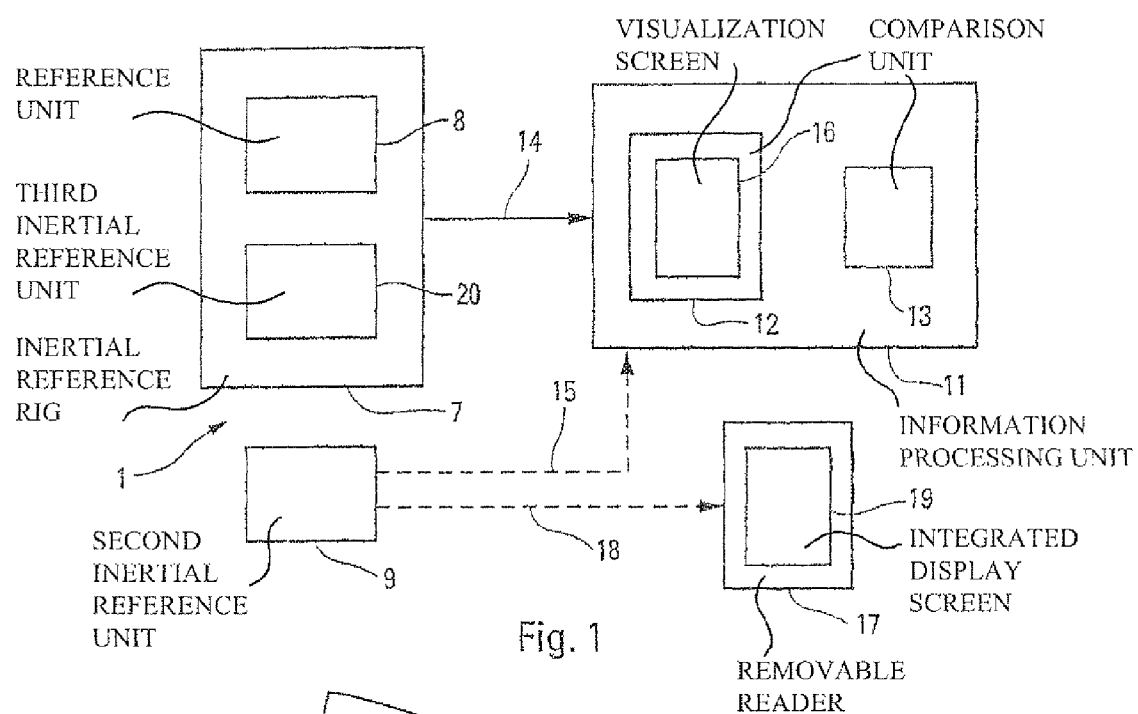
FIG. 1 is the schematic diagram of a measurement device in accordance with the invention.
Figure 2:
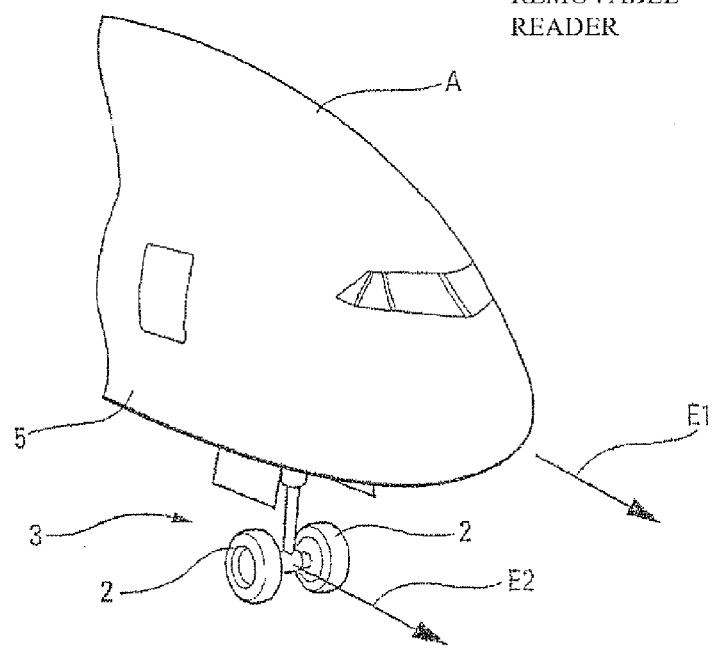
FIG. 2 diagrammatically and partially shows the nose of an aircraft, with a nose landing gear extended.
Figure 3:
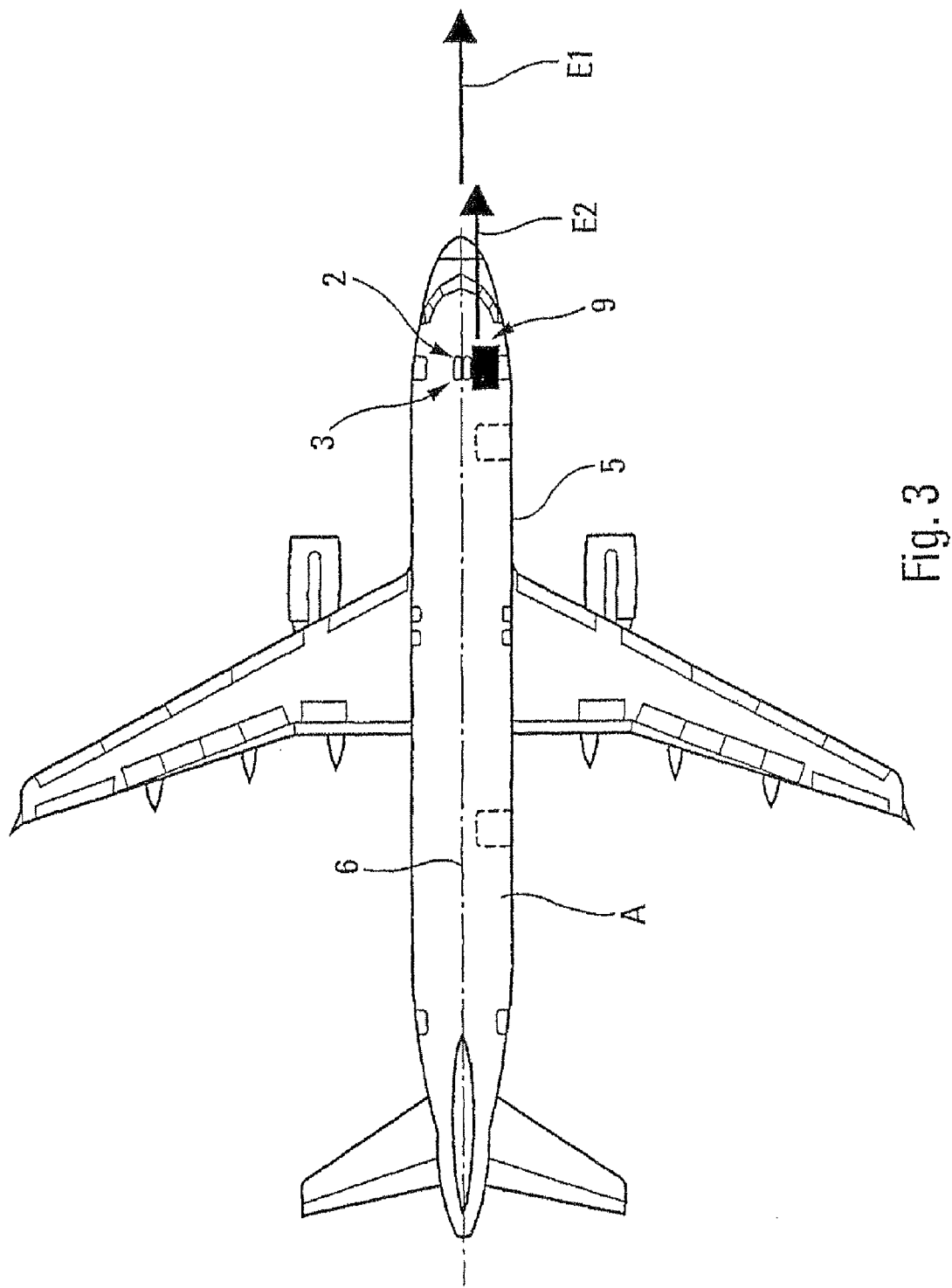
FIG. 3 diagrammatically shows an aircraft in a plan view, on which have been represented the various headings measured by the measurement device in accordance with the invention.

The device 1 according to the invention and represented diagrammatically in FIG. 1 is intended to measure (and possibly to correct or adjust) the orientation of the wheels 2 of the nose landing gear 3 of an aircraft A, in particular of a transport aircraft, which orientation is defined with respect to the fuselage 5 of said aircraft A, and more precisely with respect to the longitudinal axis 6 of said aircraft A which is represented in FIGS. 2 and 3.

It is known that when running over the ground, for example over an access way or a runway of an airport (with a view to take off or landing), the steering of an aircraft A is controlled by a pilot who for this purpose manipulates a standard appropriate means of actuation (not represented), for example a steering wheel, intended to control the deflection of the nose landing gear 3. The angle of deflection is the angle made by the steerable wheels 2 with the longitudinal plane of the aircraft A, during the deflection controlled by the pilot. For safety reasons, as well as for reasons of comfort of ground running, it is necessary that in the undeflected position (the aforesaid means of actuation then being in a neutral central position), the nose landing gear 3 be parallel to the fuselage 5 of the aircraft A so that:
when the pilot carries out a rightward (respectably leftward) deflection command, it causes a proportional deflection of the wheels 2 to the right (respectively to the left); and
when there is no deflection (aforesaid neutral position), the aircraft A runs straight ahead, along its longitudinal axis 6.

Of course, to be able to correct a possible maladjustment (lack of parallelism in the neutral position of the steerable wheels 2 with respect to the longitudinal axis 6), it is necessary to know the value of this maladjustment, that is to say the exact value of the orientation of said nose landing gear 3 with respect to the longitudinal axis 6 of the aircraft A.

The device 1 in accordance with the invention is intended to measure such an orientation. This device 1 is applied to an aircraft A which is furnished with an inertial reference rig 7, for example of ADIRS type ("Air Data Inertial Reference System"), that is to say an inertial reference rig integrating the functions of an anemobarometric rig, and comprising at least one first inertial reference unit 8, preferably of ADIRU type ("Air Data Inertial Reference Unit").

According to the invention, said device 1 comprises, as represented in FIG. 1:
said inertial reference rig 7 which is capable of measuring the heading C1 of the aircraft A, that is to say the heading C1 along the longitudinal axis 6 of said aircraft A as represented by an arrow E1 in FIGS. 2 and 3;
a second inertial reference unit 9 which is capable of being mounted, by way of a fixing system 10, on a wheel 2 of the nose landing gear 3, as specified hereinbelow, and which is then capable of measuring the heading C2 of said nose landing gear 3 in a (neutral) position corresponding to an absence of deflection of the wheels 2, as is represented by an arrow E2 in FIGS. 2 and 3; and
an information processing unit 11 comprising means 12, 13 making it possible to carry out the comparison between said measured heading C2 of the nose landing gear 3 and said measured heading C1 of the aircraft A in such a way as to be able to deduce therefrom the exact angular orientation of said nose landing gear 3 with respect to the fuselage 5 of the aircraft A.

Said information processing unit 11 which is carried on board the aircraft A is connected by a fixed link 14 to said inertial reference rig 7 and can be connected by a removable link 15 (represented by dashes) to said inertial reference unit 9.

Moreover, said information processing unit 11 comprises a display means 12 which is capable of displaying on a visualization screen 16:
in a first variant, the values of heading C1 and C2 measured respectively by said inertial reference rig 7 and said inertial reference unit 9. An operator who has thus knowledge of said heading values C1 and C2 can then personally carry out the aforesaid comparison between these two values;

in a second variant, the difference (or the deviation) between these heading values C1 and C2, that is to say the result of the aforesaid comparison; and in a third variant, at one and the same time said heading values C1 and C2 and said difference.

To implement these latter two variants, said information processing unit 11 can comprise a means of comparison 13 which automatically calculates said difference between the values C1 and C2.

In a particular embodiment, the device 1 in accordance with the invention moreover comprises a removable reader 17 which is capable of being linked by a link 18 (represented by dashes) to said inertial reference unit 9 in such a way as to be able to read the heading measured by the latter and to display it on an integrated display screen 19. This allows an operator to read the value in immediate proximity to the wheel 2 of the aircraft A on which said inertial reference unit 9 is mounted without having to access the flight deck where the visualization screen 16 is generally situated.

In a particular embodiment, the inertial reference rig 7 moreover comprises another inertial reference unit 20, and said inertial reference rig 7 determines the heading C1 of the aircraft A, with the aid of the measurements carried out by said two inertial reference units 8 and 20.

Preferably, at least one of said inertial reference units 8, 9 and 20 comprises a standard gyrolaser, which is an apparatus for measuring the angular speed, the principle of which is based on the propagation of coherent light. It is known that such a gyrolaser uses the acceleration of the earth to determine the heading.

Furthermore, in a preferred embodiment, said inertial reference unit 9 forms part of said inertial reference rig 7 of the aircraft A, and is capable of being dismantled from said aircraft A (where it is initially installed) so as to be mounted on the wheel 2 with a view to the measurement of the heading C2 (before being remounted on the aircraft A at the conclusion of the measurements), this making it possible to reduce the cost of said device 1 in accordance with the invention which thus comprises only measurement elements which already exist on the aircraft A. The same holds for the information processing unit 11. Consequently, the reader 17 alone (which moreover is not indispensable to the implementation of the present invention) does not form part of the aircraft A.

Moreover, when it is mounted on the wheel 2, said inertial reference unit 9 is capable of being supplied electrically (in standard fashion) by a means (not represented) of standard electrical supply of the aircraft A. Thus, the device 1 in accordance with the invention exhibits considerable autonomy, since it does not require supply outside the aircraft A, or any battery for charging.

Figure 4:
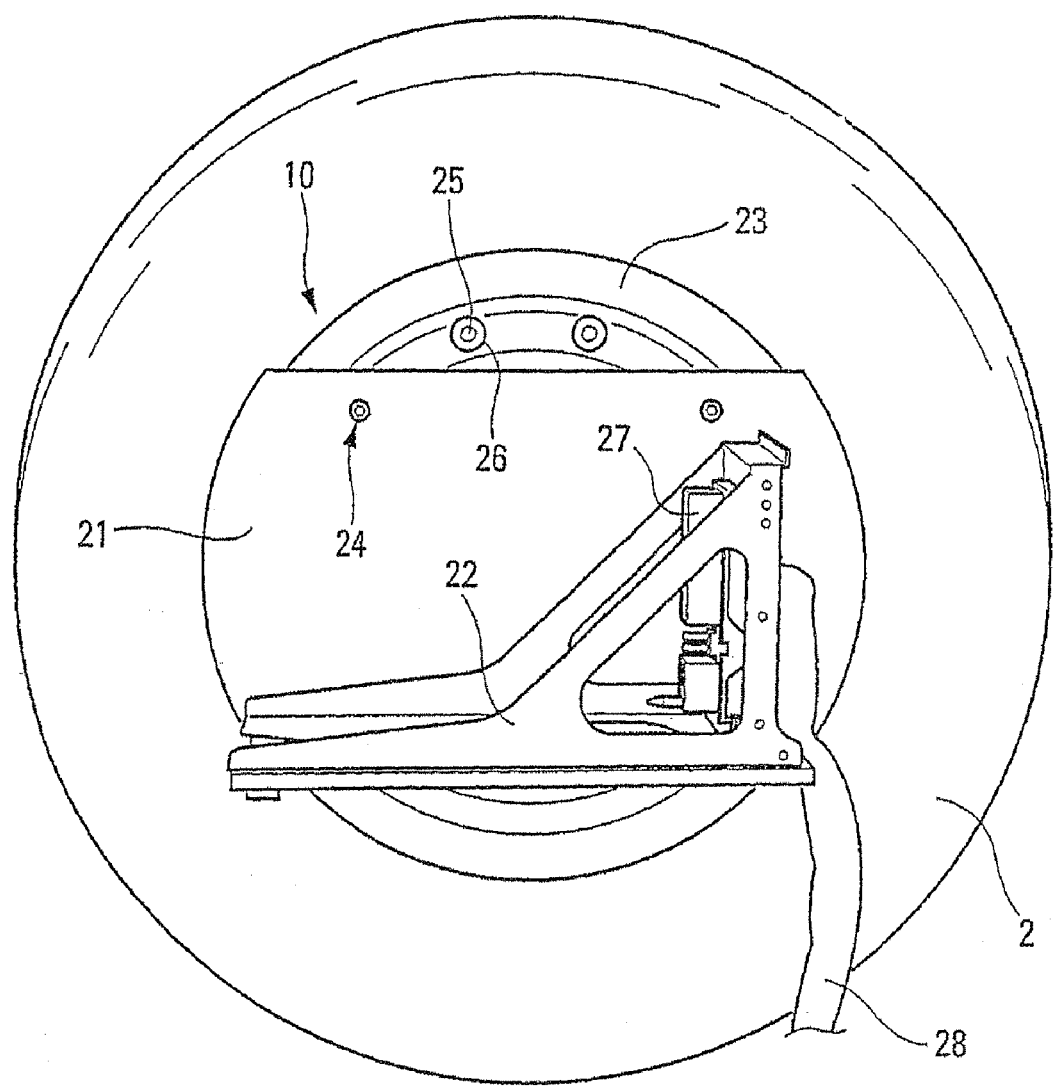
FIG. 4 shows a support plate which is mounted on a wheel of a nose landing gear.
Figure 5:
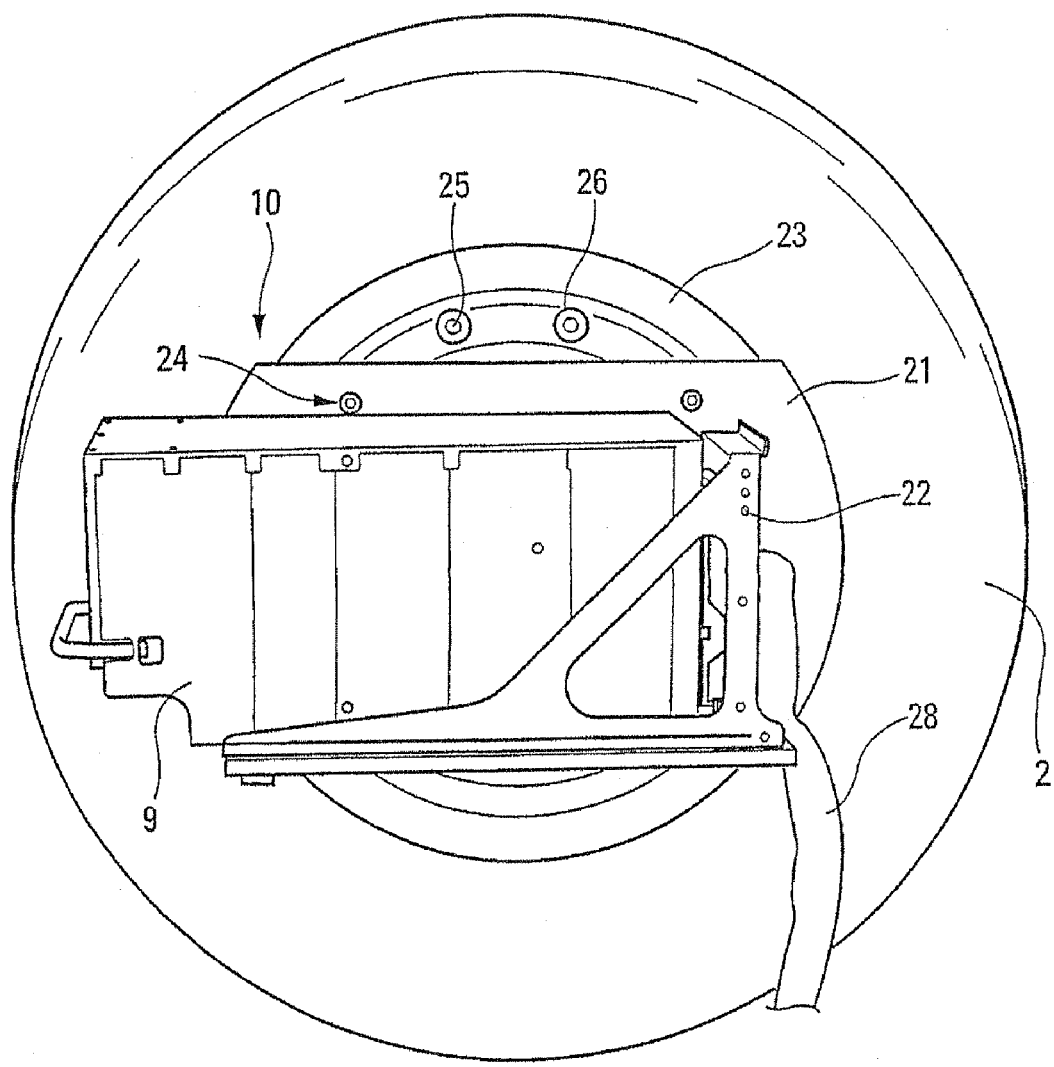
FIG. 5 shows an inertial reference unit which is carried by the support plate represented in FIG. 4.
Figure 6:
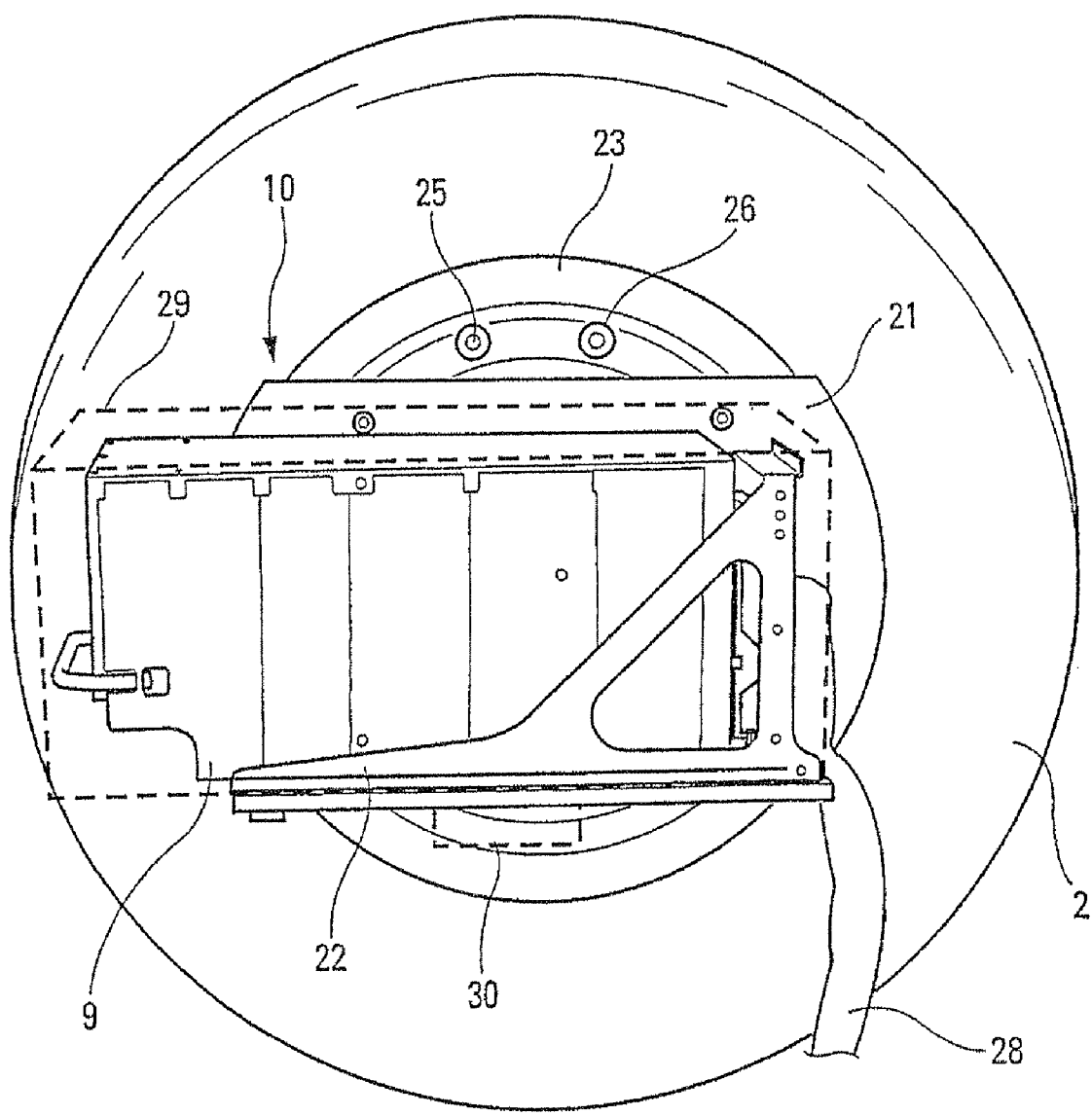
FIG. 6 is a figure similar to that of FIG. 5, showing diagrammatically additional characteristics of the present invention.

Additionally, in a particular embodiment represented in FIGS. 4, 5 and 6, said fixing system 10 comprises a plate 21, made of wood or metal for example:

which is furnished with a fixed support 22 capable of receiving said inertial reference unit 9, as represented in FIGS. 5 and 6; and which is capable of being mounted on the rim 23 of said wheel 2, preferably the right wheel of the nose landing gear 3, parallel to said rim 23.

For this purpose, said plate 21 is fixed on the rim 23 of said wheel 2 with the aid of nuts 24 which cooperate with parts of screws 25 of said rim 23 which overhang cooperating nuts 26, as represented for bolts not used in FIGS. 4 to 6. Thus, the installation of said plate 21 and hence of said inertial reference unit 9 may be carried out easily, and in a fast and accurate manner.

Said fixing system 10 moreover comprises a standard connector 27 which is intended to cooperate with a cooperating connector (not represented) at the inertial reference unit 9, when the latter is mounted on the support 22 (FIGS. 5 and 6). The connector 27 is fixed to the support 22 and is connected to a cable or bundle 28 comprising at least one of the aforesaid data transmission links 15 and 18.

In a particular embodiment represented very diagrammatically in FIG. 6, said fixing system 10 is furnished moreover:

with a protective hood 29, thereby making it possible to protect said inertial reference unit 9 in particular from rain; and/or with a standard fan 30. Thus, the device 1 in accordance with the invention can be used with no problem in very hot weather.

Said device 1 therefore exhibits very numerous advantages. In particular:

its measurements are very accurate;

fitment thereof is simplified, reliable and accurate, in particular with respect to that of a standard laser measurement tool of aforesaid type. Also it becomes easily possible to carry out systematic monitoring of the orientation of the nose landing gear 3 (even in the assembly plant) so that each aircraft A leaving assembly plants is within the tolerances of the airlines as regards the orientation of the nose landing gear 3;

its cost is reduced;

it exhibits considerable autonomy;

its measurements are not disturbed by poor weather conditions (rain, heat, wind, etc.); and it can be used on any type of aircraft A comprising an inertial reference rig 7 capable of measuring the heading C1 of the aircraft A.

Within the framework of the present invention, when one wishes (in addition to making measurements) also to correct the orientation of said nose landing gear 3, as soon as the difference (in angular value) between said measured heading C2 of the nose landing gear 3 and said measured heading C1 of the aircraft A is greater than a first predetermined angular value, for example 3°, the orientation of said nose landing gear 3 is corrected so as to obtain a difference (or deviation) of heading which becomes less than a second predetermined angular value, for example 0.1°.

In a preferred embodiment, for which the inertial reference unit 9 forms part of the inertial reference rig 7 of the aircraft A, the following successive steps are implemented during the measurement and the adjustment (or correction) of the orientation of said nose landing gear 3:

during preparation:

the inertial reference unit 9 is dismantled from the aircraft A;

the fixing system 10 is installed on the wheel 2, and the cable 28 is connected to the information processing unit 11;

the inertial reference unit 9 is installed on said fixing system 10;

during a subsequent measurement and a subsequent adjustment:

the aircraft A is supplied electrically and hydraulically, the inertial reference rig 7 and the inertial reference unit 9 are powered up;

the heading C1 of the aircraft A is measured with the aid of the inertial reference rig 7;

the heading C2 of the nose landing gear 3 is measured with the aid of the inertial reference unit 9;

said headings C1 and C2 are compared;

as a function of this comparison, the orientation of the wheels 2 is adjusted in standard fashion if necessary;

optionally, measurements of heading and a comparison are redone to verify that the adjustment has been properly carried out;

during a final reinstatement:

the inertial reference unit 9 is dismantled and it is reinstalled on the aircraft A in its customary place;

the fixing system 10 is dismantled.

What is claimed is:

1. A method for measuring an orientation of a nose landing gear of an aircraft which is furnished with an inertial reference rig with at least a first inertial reference unit, comprising:
   a) mounting a second inertial reference unit on one of the wheels of said nose landing gear;
   b) measuring the heading of said nose landing gear in the absence of deflection of the nose landing gear with the aid of said second inertial reference unit;
   c) measuring the heading of the aircraft with the aid of at least said first inertial reference unit of said inertial reference rig; and
   d) comparing said measured heading of the nose landing gear with said measured heading of the aircraft to deduce therefrom the orientation of said nose landing gear with respect to the fuselage of the aircraft,
   wherein said second inertial reference unit forms part of said inertial reference rig and in step a), said second inertial reference unit is dismantled from the aircraft, before being mounted on said wheel.

2. The method as claimed in claim 1, wherein, in step a), said second inertial reference unit is mounted on a plate which is fixed on the rim of said wheel.

3. The method as claimed in claim 2, wherein said plate is fixed on parts of screws of said rim which overhang cooperating nuts.

4. The method as claimed in claim 1, wherein said inertial reference rig moreover comprises a third inertial reference unit, and the heading of the aircraft is determined with the aid of the measurements carried out by said first and third inertial reference units.

5. The method as claimed in claim 1, further comprising adjusting the orientation of the nose landing gear, wherein, when the difference between said measured heading of the nose landing gear and said measured heading of the aircraft is greater than a first predetermined value, the orientation of said nose landing gear is modified to obtain a difference which becomes less than a second predetermined value.

6. An aircraft, comprising a device implementing the method specified under claim 1.

7. A device for measuring an orientation of a nose landing gear of an aircraft, comprising:
   an inertial reference rig including at least a first inertial reference unit, said inertial reference rig measuring the heading of the aircraft;
   a second inertial reference unit mounted, by way of a fixing system, on a wheel of the nose landing gear and measuring the heading of said nose landing gear in a position corresponding to an absence of deflection; and
   an information processing unit having a comparison unit to carry out the comparison between said measured heading of the nose landing gear and said measured heading of the aircraft to deduce therefrom the orientation of said nose landing gear with respect to a fuselage of the aircraft,
   wherein said second inertial reference unit forms part of said inertial reference rig of the aircraft and is capable of being dismantled from said aircraft.

8. The device as claimed in claim 7, wherein said fixing system comprises a plate, which is furnished with a fixed support receiving said second inertial reference unit; and which mounted on the rim of said wheel.

9. The device as claimed in claim 7, wherein said fixing system is furnished with a protective hood.

10. The device as claimed in claim 7, wherein said fixing system is furnished with a fan.

11. The device as claimed in claim 7, wherein said second inertial reference unit is supplied electrically by electrical supply of the aircraft.

12. The device as claimed in claim 7, wherein said inertial reference rig further comprises a third inertial reference unit, and said inertial reference rig determines the heading of the aircraft, with the aid of the measurements carried out by said first and third inertial reference units.

13. The device as claimed in claim 7, wherein said second inertial reference unit is linked to said information processing unit to transmit information to the information processing unit which comprises at least a screen for displaying measurements.

14. The device as claimed in claim 7, further comprising a removable reader linked to said second inertial reference unit to read the heading measured by the second inertial reference unit and to display it on an integrated display screen.

15. The device as claimed in claim 7, wherein at least one of said inertial reference units comprises a gyrolaser which uses an acceleration of earth to measure the heading.

16. An aircraft, comprising a device specified under claim 7.

* * * * *